United States Patent [19]

Billman et al.

[11] Patent Number: 4,871,823
[45] Date of Patent: Oct. 3, 1989

[54] 1-ALKENE/EXCESS MALEIC ANHYDRIDE POLYMERS

[75] Inventors: Fred L. Billman; Lih-Bin Shih; Calvin J. Verbrugge, all of Racine, Wis.

[73] Assignee: S. C. Johnson & Son, Inc., Racine, Wis.

[21] Appl. No.: 95,799

[22] Filed: Sep. 11, 1987

[51] Int. Cl.$^4$ ............................................. C08F 222/04
[52] U.S. Cl. ................................................. 526/272
[58] Field of Search ...................................... 526/272

[56] References Cited

U.S. PATENT DOCUMENTS

| | | | |
|---|---|---|---|
| Re. 28,475 | 7/1975 | Blecke et al. | 260/78.5 |
| 2,378,629 | 6/1942 | Hanford | 260/78 |
| 2,430,313 | 11/1947 | Vana | 260/78.5 |
| 2,527,081 | 10/1950 | Ross et al. | 260/78.5 |
| 2,857,365 | 10/1958 | Johnson | 260/78.5 |
| 2,913,437 | 1/1959 | Johnson | 260/78.5 |
| 2,921,928 | 1/1960 | Fields et al. | 260/78 |
| 2,938,016 | 1/1960 | Johnson | 260/78.5 |
| 2,980,653 | 1/1961 | Johnson | 260/78.5 |
| 3,073,805 | 1/1963 | Reinhard | 260/78.5 |
| 3,073,806 | 1/1963 | Reinhard | 260/78.5 |
| 3,083,189 | 3/1963 | Reinhard | 260/78.5 |
| 3,311,596 | 3/1967 | Berding et al. | 260/78.5 |
| 3,380,972 | 4/1968 | LeBlanc et al. | 260/78.5 |
| 3,393,168 | 7/1968 | Johnson | 260/29.7 |
| 3,532,656 | 10/1970 | Burdick et al. | 260/28.5 |
| 3,580,893 | 5/1971 | Heilman | 260/78.5 T |
| 3,642,726 | 2/1972 | Heilman | 260/78.5 T |
| 3,720,651 | 3/1973 | Imoto et al. | 260/78.5 R |
| 3,729,451 | 4/1973 | Blecke et al. | 260/78.5 R |
| 3,741,940 | 6/1973 | Heilman | 260/78.5 T |
| 3,884,857 | 5/1975 | Ballard et al. | 260/28.5 AV |
| 4,068,776 | 1/1976 | Wszolek | 215/349 |
| 4,071,581 | 1/1978 | Yokoyama | 260/878 R |
| 4,180,637 | 12/1979 | Evani et al. | 526/204 |
| 4,202,955 | 5/1980 | Gaylord | 526/272 |
| 4,250,289 | 2/1981 | Denzinger et al. | 526/201 |
| 4,526,950 | 7/1985 | Grava | 526/272 |
| 4,613,646 | 9/1986 | Sandvick | 524/426 |
| 4,748,196 | 5/1988 | Kuroda et al. | 524/43 |

FOREIGN PATENT DOCUMENTS 2840502 3/1980 Fed. Rep. of Germany .

OTHER PUBLICATIONS

*Macromolecular Syntheses*, Overberger, ed., vol. 1, 1963, pp. 42–45.

Primary Examiner—Joseph L. Schofer
Assistant Examiner—Alex H. Walker

[57] ABSTRACT

Disclosed is a free-radical addition polymer containing from 55 mole percent to about 95 mole percent of units derived from maleic anhydride and from about 5 mole percent to about less than 45 mole percent of units derived from 1-alkenes having at least 4 carbon atoms wherein the polymer has an average of at least one unit derived from a 1-alkene per polymer chain making up the polymer based on the number average molecular weight of the polymer and thus contains excess units derived from maleic anhydride randomly dispersed throughout the polymer. The polymers are useful in detergents as stabilizers, additives to floor polishes and, especially when esterified with alcohols, as surfactants.

16 Claims, No Drawings

1-ALKENE/EXCESS MALEIC ANHYDRIDE POLYMERS

BACKGROUND OF THE INVENTION

1. Field of the Invention

This invention relates to 1-alkene/maleic anhydride free-radical addition polymers which contain at least 55 mole percent of units derived from maleic anhydride which units are randomly distributed throughout the polymer chains making up the polymer.

2. Description of the Prior Art

Those skilled in the art have commonly believed that polymers of maleic anhydride and 1-alkenes only form polymers containing approximately equimolar ratios of maleic anhydride and 1-alkenes (also known as "alpha-olefins").

For example, U.S. Pat. No. 3,461,108 to Heilman et al. teaches that copolymers of maleic anhydride and an aliphatic olefin such as 1-hexene can be reacted in molar ratios of olefin to maleic anhydride varying from 0.1:1 to 100:1. However, Heilman et al. teaches that the result is a copolymer product that is essentially a chain of alternate groupings of maleic anhydride and the olefinic monomer reactants even though much higher or lower ratios of olefin to maleic anhydride than 1:1 were used. Heilman et al. teaches that the reaction temperatures to make such polymers are between 20° C. and 200° C., with preferred temperatures between 50° C. and 120° C. Examples 17 and 18 of this Heilman, et al. patent teach reacting 100 moles of maleic anhydride with 1 mole of 1-hexene at 60° C. for 165 hours to obtain a large, semi-solid gummy agglomerated mass. No analysis of the resulting mass is reported in those examples. Various methods for bringing the reactants together are taught such as by mixing all of the reactants together in a batch system or by adding the olefin intermittently or continuously to the reaction pot.

Similar teachings with regard to processing, molar ratios, and the equimolar composition of the final product for polymers of maleic anhydride with other 1-alkenes are found in Hazen, et al. U.S. Pat. Nos. 3,553,177; 3,560,455; 3,560,456; and 3,560,457 and in Heilman, et al. U.S. Pat. No. 3,706,704, all of which are assigned to Gulf Research & Development Company, as is U.S. Pat. No. 3,461,108. U.S. Pat. No. 2,938,016 to Johnson (Monsanto Chemical Company) has a similar statement about equimolar nature of the final product, but Examples 34, 35 and 39 employ an initial excess of maleic anhydride and more olefin is then added during the process.

U.S. Pat. No. 4,358,573 to Verbrugge teaches that terpolymers of maleic anhydride and alpha olefins containing a small excess of maleic anhydride relative to total alpha olefin can be obtained under certain conditions such as when high initiator levels are used. Verbrugge teaches terpolymers containing up to 60 mole percent of maleic anhydride although his examples teach adding molten maleic anhydride and initiator dropwise to a flask containing solvent and alpha olefins that was heated to 160° C.

U.S. Pat. No. 4,522,992 to Verbrugge contains similar teachings with regard to terpolymers containing maleic anhydride, an aromatic monoalkenyl monomer such as styrene and a 1-alkene having at least 18 carbon atoms. However, the process used is different since, in the Examples, one alkene is placed in a flask with solvent and heaeed to 140° C. The maleic anhydride is placed in one dropping funnel and the aromatic monomer and initiator is placed in a second dropping funnel. The contents of the dropping funnels are slowly added to the heated flask over a period of time.

U.S. Pat. No. 3,178,395 to Muskat teaches use of peroxide catalysts in excess of 2% coupled with temperatures in excess of 90° C. where the monomers reacted are in the molar ratio of 1:2 to 2:1 olefin to maleic anhydride to result in a product which usually has a molar ratio of substantially 1:1.

U.S. Pat. No. 2,542,542 to Lippincott et al. teaches reacting maleic anhydride with 1-alkenes at 100° to 200° C. using a peroxide catalyst where the presence and nature of the solvent used changed the molar ratio of maleic anhydride to 1-alkene in the product.

Contrary to accepted beliefs, U.S. Pat. No. 4,192,930 to Beck, et al. teaches that the copolymers used are preferably those comprising maleic anhydride and olefins in a molar ratio of 0.8:1 to about 1.8:1 and states that such are known in the art, yet no specific examples of the manufacture of polymers having greater than 1:1 molar ratios of maleic anhydride to olefins are given. U.S. Pat. No. 4,072,621 to Rose teaches that the ratio of maleic anhydride to vinyl alkyl ether or 1-alkenes having 1–4 carbon atoms in the polymers useful in his invention is from 2:1 to 1:2, but does not give examples showing how to make polymers containing greater than equimolar ratios of maleic anhydride.

U.S. Pat. No. 3,261,798 to Farley teaches maleic anhydride/alpha-olefin copolymer where the reactants are added in a molar ratio of 1:1 to 1:9 (maleic anhydride excess) made at 130° C. to 180° C. in solvent using dialkyl peroxides. Use of a solvent is said to result in inclusion of greater than stoichiometric amounts of maleic anhydride in the product such as 1:1.43. Example 1 of the Farley patent teaches adding all of the olefin mixture and one half of the initiator to the reaction vessel and then adding the remainder of the initiator and the maleic anhydride to the flask over a period of time at 140°–145° C. No analysis of the polymer was reported.

U.S. Pat. No. 4,083,794 to Lee, et al. teaches the use of copolymers of maleic anhydride with a monoethylenically unsaturated monomer or mixture of monomers such as ethylene or propylene as well as methyl methacrylate or styrene where the molar ratio of maleic anhydride to unsaturated monomer is from 2.5:1 to 100:1, preferably from 2.5:1 to 30:1 and more preferably, from 2.5:1 to 7:1. Examples 8 and 9 employed 2.5 moles of maleic anhydride to 1 mole of ethylene and propylene, respectively, but these examples were written in the present tense. The copolymers and their production are said to be taught in British Pat. No. 1,414,918 which teaches copolymers of various olefin monomers and maleic anhydride in the above proportions having a molecular weight of between about 300–1000, but only teaches ethylene and propylene as 1-alkenes and provides no working examples other than the same disclosure of Examples 8 and 9 of the '794 patent. The British '918 patent prefers copolymers of acrylic or methacrylic acid and their derivatives or styrene as agents to prevent boiler scale formation.

U.S. Pat. No. 3,755,264 to Testa teaches production of copolymers of acrylic acid, styrene or vinyl acetate with maleic anhydride where the copolymers contain 99 to 85 mole percent of maleic anhydride by using a large amount of free-radical initiator (at least 6% by weight of incrementally adding the monomer incrementally to maleic anhydride at 100° C. to 145° C. It does not suggest using 1-alkenes in this process.

U.S. Pat. No. 3,264,272 to Rees teaches a method of making low molecular weight copolymers of maleic anhydride and alpha-olefins, preferably styrene, which are free of homopolymers of the alpha-olefin and contain an excess of the olefin. The invention involves using higher temperatures such as greater than 140° C. while feeding the styrene and maleic anhydride into a reactor together dissolved in solvent.

None of the above patents appear to recognize what we have discovered with regard to polymers of maleic anhydride and 1-alkenes that contain at least 55 mole percent of maleic anhydride, and preferably greater than about 60 mole percent of maleic anhydride, and their uses.

SUMMARY OF THE INVENTION

One object of the present invention is to provide free radical addition polymers wherein the maleic anhydride unit content of the polymers is at least 55, more preferably from 60-65 mole percent on up to about 95 mole percent provided that there is at least one unit derived from a 1-alkene per polymer chain making up the polymer.

A further object of the present invention is to provide addition polymers wherein the reacted maleic anhydride is substantially randomly distributed throughout the resulting polymer rather than being a mixture of an alternating copolymer of maleic anhydride and 1-alkene which also contains significant amounts of undesirable polymaleic anhydride.

The polymers of the present invention can be used in the same known applications as addition polymers having a substantially equimolar ratio of maleic anhydride and 1-alkenes such as additives to floor polishes and mold release agents.

One significant advantage of the polymers of the present invention is derived from the presence of additional maleic anhydride distributed throughout the polymer that results in a polymer having more hydrophilic character than a 50:50 copolymer of maleic anhydride and the same 1-alkenes. As a result, maleic anhydride/1-alkene copolymers having an excess of maleic anhydride and, for example, a higher 1-alkene such as 1-decene (which is easier to produce) can be substituted for a 50:50 molar ratio polymer of maleic anhydride and a lower 1-alkene such as 1-hexene (which is more difficult to produce) in a built liquid detergent composition which is stabilized by the presence of a small amount of such a polymer which also improves the anti-redeposition characteristics of the detergent composition.

These and other objects and advantages of the present invention are provided by a composition of matter comprising a free-radical addition polymer containing from 55 to about 95, more preferably from 60 to 95, mole percent of units derived from maleic anhydride, and from about 5 to less than 45, more preferably 5 to 40, mole percent of units derived from at least one 1-alkene having at least 4 to 30+ carbon atoms, more preferably from 4, particularly 6, to 18 carbon atoms or from 12 to 30+ carbon atoms depending upon the desired end use, wherein the polymer has an average of at least one unit derived from a 1-alkene per polymer chain based on the number average molecular weight of the polymer. In an alternative embodiment, the polymer contains at least two different 1-alkenes, preferably a 1-alkene having from 4 to 16 carbon atoms and another 1-alkene having at least 18 carbon atoms. To provide more 1-alkene units in the polymer, an upper limit of 80 mole percent is desirable, but this limit depends upon the chain length of the 1-alkene selected.

In a yet further alternative embodiment having utility as a surfactant, i.e., surface-active agent, the polymers of the present invention have from 1 to 50 mole percent of the carboxyl radicals present in the maleic anhydride units present esterified with, for example a monohydride aliphatic alcohol having from about 6 to 30+ carbon atoms such as 1-decanol or a polyoxyalkylene ether alcohol having from 2 to 20 oxyalkylene units such as a 1-dodecanol ether of polyethylene oxide having from 2 to 20 units derived from ethylene oxide.

DETAILED DESCRIPTION OF THE PREFERRED EMBODIMENT

The anhydride used in the compositions of the present invention is most preferably pure maleic anhydride. However, other maleic anhydride analogs can be utilized such as methylmaleic anhydride, dimethylmaleic anhydride, fluoromaleic anhydride, methylethylmaleic anhydride and the like. Accordingly, as employed herein, the term "maleic anhydride" includes such analogs in whole or in part. It is preferred that the anhydride be substantially free of acid and the like before polymerization.

The 1-alkenes suitable for use in the compositions of the present invention have from 4 to 30+ carbon atoms and include the following: 1-butene; 1-pentene; 1-hexene; 1-heptene; 1-octene; 1-nonene; 1-decene; 1-dodecene; 1-tetradecene; 1-hexadecene; 1-heptadecene; 1-octadecene; 2-methyl-1-butene; 3,3-dimethyl-1-pentene; 2-methyl-1-heptene; 4,4-dimethyl-1-heptene; 3,3-dimethyl-1-hexene; 4-methyl-1-pentene; 1-eicosene; 1-docosene; 1-tetracosene; 1-hexacosene; 1-octacosene; 1-triacontene; 1-dotriacontene; 1-tetratriacontene; 1-hexatriacontene; 1-octatriacontene; 1-tetracontene; 1-dotetracontene; 1-tetratetracontene; 1-hexatetracontene; 1-octatetracontene; 1-pentacontene; 1-hexacontene and mixtures thereof.

Those skilled in the art will appreciate that the 1-alkenes can be used in the form of pure materials such as 1-hexene or 1-octadecene or can be mixtures of various alkenes. This is particularly true for the higher alkenes where it is preferred for economic reasons to use mixtures of the higher 1-alkenes (i.e., those having more than about 20 carbon atoms per molecule—"$C_{20+}$ 1-alkenes"). For example, a mixture of $C_{30+}$ 1-alkenes which is described in U.S. Pat. No. 3,553,177 can be used. As noted in that patent, a mixture of even chain length 1-alkenes is obtained. Another mixture of higher alkenes is a mixture of $C_{20}$ to $C_{24}$ 1-alkenes which is commercially available from Gulf Oil (Chevron Corp.). The 1-alkenes used should be essentially monoolefinic because diolefins cause gel formation and cross-linking. Small amounts of diolefins, typically less than 2 percent by weight, can be tolerated as an impurity in the higher 1-alkene monomer.

More preferably, the 1-alkenes are those having from 6 to 18 carbon atoms per molecule such as 1-hexene, 1-decene, 1-tetradecene and 1-octadecene wherein the polymers formed from such 1-alkenes and maleic anhydride are useful as surfactants, hydrotropes and additives to floor polishes.

More preferably, the 1-alkenes are those having from 12 to 30+ carbons atoms per molecule such as 1-dodecene, 1-tetradecene, 1-octadecene, mixtures of 1-alkenes having from 20 to 24 carbon atoms and mixtures of $C_{30+}$ 1-alkenes wherein the polymers formed from such 1-alkenes and maleic anhydride are useful as surfactants.

In another preferred embodiment, at least two different 1-alkenes are used such as a combination of at least one 1-alkene selected from lower 1-alkenes having from 4 to 16 carbon atoms and more preferably from 4 to 10 carbon atoms and at least one 1-alkene selected from higher alkenes having at least 18 carbon atoms and more preferably, 1-octadecene, a mixture of $C_{20}$ to $C_{24}$ 1-alkenes or a mixture of $C_{30+}$ 1-alkenes as is taught in U.S. Pat. No. 4,358,573.

To effect addition polymerization of the maleic anhydride with the 1-alkenes, at least one thermally decomposable initiator which provides a source of free radicals is employed which is effective at the 145° C. or greater reaction temperatures used in the present preferred method of making the invention. These initiators are well known in the art and include peroxides, hydroperoxides and azo compounds which generate free radicals upon being heated to initiate polymerization through the unsaturated radicals present in the reactants. Examples of such initiators are tertiary-butyl perbenzoate, di(tertiary-butyl) peroxide, tertiary-butyl peroxypivalate, tertiary-butyl peroctoate, tertiary-butyl peroxy neodecanoate, tertiary-amyl peroxypivalate, benzoyl peroxide, 2,5-dimethyl-2,5-di(tertiary-butyl peroxy) hexyne-3, cumene hydroperoxide, acetyl hydroperoxide, diacetyl peroxide, diethylperoxy carbonate, lauroyl peroxide, tertiary-butyl hydroperoxide, para-bromobenzene diazonium fluoborate, para-tolyl diazoaminobenzene, para-bromobenzene diazonium hydroxide, azo-methane and the phenyldiazonium halides.

Specific initiators are chosen with respect to their half-life at the reaction temperatures to be used, reactivity with unsaturated monomers and solubility in the reaction mixture and any solvent to be used in the process in a manner known to those of ordinary skill in the art. While the actual amount of such initiators used is not critical, a sufficient amount must be employed to result in substantially complete conversion of the monomers to polymer. Generally, from 0.5 to 6 mole percent of initiator based on the total moles of unsaturated reactants present is employed and more preferably, from 1 to 3 mole percent initiator. The initiator is generally dissolved in the 1-alkene which is added in the manner described below to the reactor during the process of making the polymers although it can also be added to the reactants neat or in the form of a solvent solution over a period of time. A presently preferred initiator is di(tertiary-butyl) peroxide.

Those skilled in the art will appreciate that other free-radical initiators and sources of free radicals may be useful in preparing the compositions of the present invention after studying the teachings herein. Thus, other well known free radical polymerization techniques such as ionizing radiation, e.g., ultraviolet light or electron beam sources may be useful in preparing such polymers compositions using catalytic amounts of well known ultraviolet light sensitizers as photoinitiators such as benzophenone, etc.

One or more solvents can be used in the preferred process for making the compositions of the present invention to promote reaction between the maleic anhydride and the 1-alkenes and to reduce the viscosity of the reaction mixture as the polymer is formed. The solvent should be one in which the monomeric reactants are soluble, and generally should be inert with respect to the reactants, but should be a liquid and stable at the pressures and temperatures used to make the polymer, particularly at the relatively high reaction temperatures used in the preferred method of making the present invention when that method is used. Thus, the solvent or solvents employed should not be a solvent having groups that are reactive with anhydride radicals such as those containing hydroxyl, carboxyl or aldehyde radicals because such solvents would tend to react with any maleic anhydride present. One presently preferred solvent for use in making the compositions of the present invention is "PM acetate" which is propylene glycol monomethyl ether acetate. Examples of other solvents are as follows: aliphatic and alicyclic halogen-containing compounds such as dichloromethane and 1,3-dichloropropane, aromatic esters such as dimethyl phthalate, aromatic hydrocarbons such as toluene and the various isomers of xylene, halogenated aromatic compounds such as chlorobenzene, and aliphatic esters and ketones such as butyl acetate and methyl isobutyl ketone.

In carrying out the preferred method of making the compositions of the present invention, it is important that the molar ratio of the maleic anhydride to the 1-alkene be such that the maleic anhydride is proportionally kept in excess throughout the process of adding it to the 1-alkene in the presence of the initiator and that the mixing be accomplished in such a manner that the reaction takes place at from 145° C. to 200° C., and more preferably, from 160° C. to 180° C. It is these conditions which result in a polymer product in which the maleic anhydride is substantially randomly distributed throughout the polymer formed rather than resulting in an alternating copolymer of maleic anhydride and 1-alkene which contains a substantial amount of the excess maleic anhydride present as polymaleic anhydride chains at the ends of the alternating copolymer.

We have found that this method provides unique polymers of maleic anhydride and 1-alkenes which differ from those in the prior art in that the excess maleic anhydride polymers of our invention have units derived from maleic anhydride substantially randomly distributed throughout the polymer chains which make up the total polymer. Small chains of a few units derived from maleic anhydride are interspersed throughout the polymer chains between units derived from 1-alkenes. This results in polymers which have different water solubility characteristics than simply alternating copolymers due to the number of such hydrophilic maleic anhydride units present and their placement throughout the polymer. This difference in water solubility affects the physical properties of the polymers obtained. Thus, the claimed polymers have minimal amounts of maleic anhydride in the form of polymaleic anhydride.

Generally, it is expected that about 10 mole percent or less of the maleic anhydride content of the polymer of the present invention is composed of such polymaleic anhydride chains, and more preferably less than 5 mole percent. This is further evidence of the random distribution of the 1-alkene units through the polymer. When the preferred method of the present invention is used under manufacturing conditions where pressurized reactors are used to prevent loss of reactant and obtain higher reaction temperatures, the conversion to polymer is generally close to quantitative. It is believed that polymers made by this method generally do not contain significant amounts of polymaleic anhydride at the ends of the polymer chains where less than about 80 mole percent of maleic anhydride is employed since there are enough 1-alkene units to be randomly dispersed throughout the polymer chains.

The preferred method of making the compositions of the present invention is described in a copending U.S. patent application Ser. No. 07/096,106 entitled "1-Alkene/Excess Maleic Anhydride Polymer Process" filed concurrently herewith in the names of T. P. Bosanec, K. R. Lukow and C. J. Verbrugge which is assigned to the same assignee as is the present invention and is hereby incorporated by reference to each such a method.

Another related application which teaches a continuous process for making copolymers of maleic anhydride and 1-alkenes is U.S. patent application Ser. No. 07/084,044 entitled "Continuous Process and System for Producing Polymers Comprising Maleic Anhydride and Certain Alpha-Olefins" which was filed on Aug. 11, 1987 in the names of Franck E. Behamou, Kenneth R. Lukow and Calvin J. Verbrugge and is assigned to the same assignee as is the present invention.

The compositions comprising the polymers of the present invention can be made in several ways. One first determines the molar ratio of maleic anhydride to 1-alkene desired in the polymer to be made. It is assumed that the final polymer will generally have a molar ratio of units derived from maleic anhydride to 1-alkene which is close to the starting molar ratio if loss of reactants during processing is controlled. Having selected a starting formulation, one procedure, taught in the Bosanec, Lukow and Verbrugge patent application, is where the maleic anhydride is charged to a heated supply tank and is heated to its melting point or slightly above to provide a fluid mixture which can be introduced to a heated reactor vessel which has been blanketed with inert gas to exclude oxygen. The 1-alkene or mixture of several selected is charged to a separate supply tank and the initiator is added to the 1-alkene to accomplish even introduction of the initiator during the reaction.

Alternatively, the initiator can be metered into the reactor vessel from a separate supply tank, neat or diluted in a solvent which does not react with the other reactants. As noted above, the initiator is selected in accordance with well known techniques so that it has sufficient activity at the reaction temperature to be used to accomplish essentially complete polymerization of the reacctants. Preferably, from 1 to 3 mole percent of one or a combination of initiators based on the moles of unsaturated reactants present is used with higher amounts resulting in more complete conversion to polymer.

If a solvent is used, the maleic anhydride can also be dissolved in the solvent and metered into the heated reactor vessel. The 1-alkene could also be combined with a solvent.

As noted above, the maleic anhydride and 1-alkene are proportionally metered into the heated reactor vessel containing a portion of the solvent in such a manner as to maintain an excess molar ratio of maleic anhydride relative to the 1-alkene. In place of a solvent in the heated reactor vessel, a precharge (as described below) could be present or a preformed polymer of maleic anhydride/1-alkene from a previous reaction could be present to provide a heated medium in which the reaction can take place. Metering is done at a rate which is substantially equal to the rate of reaction of the reactants to insure that units of maleic anhydride are substantially randomly dispersed throughout the polymer obtained. In manufacturing polymers with greater than about 80 mole percent of maleic anhydride, it is desirable to match the mole ratio of maleic anhydride charged to total 1-alkene so that there is at least one unit of 1-alkene per polymer chain based on the number average molecular weight of the polymer product.

To estimate the average number of 1-alkene units present in the polymers of the present invention, one uses the number average molecular weight as the basis for determining the relative amounts of units derived from maleic anhydride to those desired from 1-alkenes. This is important in predicting the type of properties to be expected from the polymers themselves since longer carbon chain 1-alkenes such as 1-octadecene will provide the polymer with more hydrophobic character than will shorter carbon chain 1-alkenes such as 1-butene or 1-hexene. It is desirable to have the units derived from maleic anhydride dispersed throughout the polymer as much as possible. This permits the 1-alkenes to exert their hydrophobic or oleophilic effect to the physical properties of the polymer in comparison to the units from maleic anhydride which provide the polymer with hydrophilic character and water solubility when hydrolyzed into the acid or alkali metal or ammonium salt forms.

To provide a suitable amount of oleophilic character, it is more desirable to have more units of the shorter carbon atom chain 1-alkenes present per polymer molecule than are needed for the longer carbon chain 1-alkenes. Thus, it is preferred that, for polymers containing 1-alkenes having less than 10 carbon atoms, the polymer contain from 65 to 80 mole percent of units derived from maleic anhydride and the balance units derived from such 1-alkenes. This is done to provide a sufficient number of 1-alkene units to provide a level of oleophilic character sufficient to provide desirable properties to the polymers, especially when the intended use for the polymers is as surfactants or as hydrotrope agents in liquid detergent compositions. Likewise, it is preferred that, for polymers containing 1-alkenes having from 10 to 18 carbon atoms, the polymer contain from 65 to 90 mole percent of units derived from maleic anhydride and the balance units derived from such 1-alkenes. For polymers containing 1-alkenes having greater than 18 carbon atoms, it is preferred that the polymer contain at least 65 mole percent of units derived from maleic anhydride.

As noted above, it is important that the mole ratio of maleic anhydride and 1-alkene charged initially be such that there is at least one unit derived from the 1-alkene per polymer chain based on the number average molecular weight of the polymer obtained. Thus, if the number average molecular weight of the polymer product is, for example, 2,000, and the 1-alkene to be used is 1-decene (molecular weight 140), then about 19 units of maleic anhydride (molecular weight 98) could be present to provide an average of one 1-alkene unit per polymer chain or molecule or a 95:5 molar ratio of units derived from maleic anhydride to units derived from 1-decene. More preferably, at least two units of 1-alkene per 18 units derived from maleic anhydride would be present to provide a molar ratio of 90:10 maleic anhydride to 1-decene units. The molar ratios charged initially will generally correspond to the molar ratios observed in the polymer obtained if the preferred method described is followed.

The reaction pressure can be atmospheric, but superatmospheric pressures are preferred with the exact pressure being dependent upon the vapor pressure of the reactants and solvent in view of the temperatures and type of initiators used and can be determined by techniques known to those of ordinary skill in the art.

The maleic anhydride and 1-alkene or mixture thereof are reacted at a temperature of at least 145° C. up to about 200° C. with 160° C. to 180° C. being more preferred. These conditions appear to force the production of polymers containing a more random distribution of the molar excess of maleic anhydride throughout the polymer chains. This is in contrast to producing a mixture of essentially alternating copolymer of maleic anhydride and 1-alkene and the excess maleic anhydride in the form of a polymeric anhydride. The reactants and initiator can be metered into a heated reactor vessel filled with solvent such as PM acetate or a mixture of solvents.

A more preferred embodiment will now be described which further provides a means by which solventless production of polymers can be accomplished. A precharge of a minor portion, preferably about 10%, of the total amount of maleic anhydride and 1-alkene having the preselected molar ratio of maleic anhydride to 1-alkene is charged to the reactor vessel and heated to the reaction temperature selected under a blanket or a pressurizing amount of inert gas such as nitorgen. The remaining maleic anhydride and 1-alkene is charged to supply tanks along with the initiator as described above. A solvent can optionally be included in the precharge or distributed between the precharge and the reactants to be combined from the supply tanks.

The process then involves mixing the maleic anhydride together with the 1-alkene or mixture thereof into the reactor vessel at a rate which is substantially equal to the reaction rate of the reactants, but at such a rate that the temperature in the reaction vessel remains controllable since the reaction is exothermic. Generally the metering of the reactants is accomplished over a period of about 1 to 3 hours and thereafter the reaction mixture formed is maintained at the preselected reaction temperature for about 30 minutes to 1 hour to insure complete conversion of monomeric reactant to polymer.

The polymer obtained can be used in solution form if a solvent was present or can be stripped of any solvent and free monomer by vacuum drying or by heating in an oven to obtain a dry polymeric product which can range from a waxy material to a brittle resinous product. The dry product can be redissolved in an organic solvent or added to an alkaline aqueous solution containing ammonium hydroxide or other alkali to hydrolyze the anhydride radicals present and form an aqueous resin cut according to procedures well known to those skilled in the art.

The polymeric product itself can be used for the same purposes as are other maleic anhydride/1-alkene copolymers such as additives to floor polishes, mold release agents and the like. Another advantage of the excess maleic anhydride/1-alkene polymer made in accordance with the present invention is that the polymers have greater solubility in water than typically 1:1 molar ratio alternating copolymers of maleic anhydride and 1-alkenes.

This difference in water solubility due to the presence of additional units of maleic anhydride can be advantageously used to permit a formulator to substitute a maleic anhydride polymer of the present invention having a higher carbon atom 1-alkene such as 1-decene in place of a maleic anhydride polymer having a lower carbon atom 1-alkene such as 1-hexene while still obtaining comparable properties such as anti-redeposition and hydrotrope characteristics in built liquid detergent compositions. For example, the polymer compositions of the present invention can be used as water soluble polymer anionic hydrotrope anti-redeposition agents in the built liquid detergent compositions claimed in co-pending U.S. patent application Ser. No. 06/839,680 filed on Mar. 14, 1986, in the names of K. K. Kristopeit and C. J. Verbrugge which is assigned to the same assignee as the present invention.

The ability to make such a substitution is a significant economic and manufacturing advantage because it is known that lower carbon atoms 1-alkenes such as 1-butene and 1-hexene possess very good anti-redeposition and other characteristics, but are difficult and time-consuming to make because the viscosity of the reaction products tend to be very high relative to the viscosity of the reaction products of maleic anhydride polymers made using higher 1-alkenes such as 1-decene or 1-octadecene.

An additional advantage of the present invention with respect to its use in hydrotropes and anti-redeposition agents is that, as described earlier, the hydrophilic and hydrophobic character of maleic anhydride/1-alkene polymers can now be varied in a broader fashion as a result of our discovery. Therefore, one can now choose from a wider variety of maleic anhydride/1-alkene polymers in selecting hydrotropes or anti-redeposition agents as a result of this invention.

It is known in the art to esterify maleic anhydride/1-alkene polymers with monohydric alcohols to modify the properties of the polymers for use as pour point depressants, additives to floor polishes and the like. Examples of patents teaching such esters can be found in U.S. Pat. Nos. 3,051,562 (Gee, et al.), 3,488,311 (Burdick, et al.), 4,151,069 (Rossi), 4,151,366 (Sackmann, et al.), 4,192,930 (Beck, et al.) and 4,240,916 (Rossi) which are hereby incorporated by reference to teach the production of such esters. It will be readily apparent to those skilled in the art that such teachings can then be applied to produce esters of the polymer compositions of the present invention.

The maleic anhydride radicals present in the polymers of the present invention can be esterified with hydroxyl-functional compounds having no more than two hydroxyl radicals per molecule and, most preferably, one hydroxyl radical per molecule wherein the hydroxyl-functional compound is free of other radicals which are reactive with anhydride or carboxyl radicals. Example of such hydroxyl-functional compounds are monohydric aliphatic and aromatic alcohols having from 1 to 30+ carbon atoms per molecule such as methanol ethanol, n-butanol, isobutanol, 3-methylpentanol, cyclohexanol, 2-ethylhexanol, isotridecanol, octadecanol, eicosanol, hexacosanol, melissyl alcohol, and phenethyl alcohol. Examples of substituted aliphatic and aromatic alcohols are compounds commonly used as surface-active agents which contain at least one and no more than two hydroxyl radicals and are free of any other radicals which are reactive with anhydride or carboxyl radicals. Examples of such compounds are mono $C_6$ to $C_{30+}$ alkyl, aralkyl aromatic ethers of polyethylene glycol having an average of from about 2 to 100 ethyleneoxy units per molecule and having one hydroxyl radical per molecule, such as polyethylene glycol cocoate having from about 5 to 15 ethyleneoxy units per molecule and ethoxylated alkyl phenols such as the polyethyleneoxy ether of nonyl phenol containing from about 2 to 100 ethyleneoxy units, sorbitan trioleate and the like. Such hydroxylated compounds are used as surfactants and are commercially available as can be seen from an examination of the 1987 edition of McCutcheon's Emulsifiers and Detergents, North American Edition, McCutcheon Division, MC Publishing Co., Glen Rock. NJ 07452.

Still other compounds which may be useful are well known polyalkylsiloxanes and polyalkylarylsiloxanes such as polydimethylsiloxanes having no more than two =CHOH units per molecule and preferably one such =CHOH unit per molecule where the hydroxyl radical is bonded to a carbon atom which is then bonded to the silicon atoms by means of carbon-silicon bonds wherein the polydimethylsiloxane may alternatively contain polyoxyalkylene units such as polyethyleneoxy units which can be further combined with polypropyleneoxy units. Such silicone materials are described in the patent literature and some such materials are commercially available from Dow Corning Corporation of Midland, Mich. and Union Carbide Corporation of Danbury, Conn.

Fluoroalcohols having from 1 to about 10 carbon atoms and more such as $CF_3OH$, $C_2F_5OH$, $CF_3CH_2OH$, $CF_3CH(OH)CF_3$, $CFH_2(CH_2)_5OH$, $CFH_2(CH_2)_9OH$, $(C_3F_7)_2CHOH$, $(C_3F_7)_3COH$ and $C_6F_5CH(OH)CH_3$ may be useful. Fluoroalcohols are known materials.

Examples of hydroxyl-functional compounds having two hydroxyl units per molecule are polyethylene glycols having from 2 to 20 ethyleneoxy units per molecule and polyethyleneoxy ethers of glyceryl cocoate, glyceryl laurate or glyceryl oleate having from about 5 to about 30 polyethyleneoxy units per molecule.

Preferred are hydroxy-functional compounds containing one hydroxyl radical per molecule selected from $C_6$ to $C_{30+}$ alkane alcohols, or $C_6$ to $C_{30+}$ alkyl monoethers of polyethylene oxide having from about 2 to 20 units derived from ethylene oxide.

The end use for the polymer dictates the degree to which the anhydride radicals are esterified since some carboxyl units are necessary to provide ionic character and water solubility characteristics to the polymers. Generally, from 1 to 50 percent of the carboxyl radicals present can be esterified (there are two carboxyl units per anhydride radical). For surfactant applications, it is preferable to have from 1 to 20 mole percent of the carboxyl radicals present esterified with such alcohols. If hydroxyl-functional compounds containing two hydroxyl units are present, only minor amounts such as no more than 10 mole percent of the total hydroxyl-functional compound and preferably none should be used since these tend to act as cross-linking agents as is taught in U.S. Pat. No. 3,962,195 to Moczygemba, et al. and will change the character of the polymers obtained.

By proper selection of hydroxyl-functional compounds, one can further alter the hydrophilicity and oleophilicity of the esterified polymers to provide polymers which have preselected surface-active properties useful for a specific application such as hydrotropes for built liquid detergent compositions.

The alcohols can be added directly to the polymer at room temperature if the polymer is in solution or to the molten polymer if the polymer is molten at or below 100° C. Other techniques are described in the patents noted above that refer to esterification of such polymers.

The term "$\overline{M}z$" as used herein means the molecular weight measure for polymers, also sometimes referred to as the "sedimentation average molecular weight", as defined in U.S. Pat. No. 4,529,787 to Schmidt et al. (assigned to the same assignee as the present invention) which is hereby incorporated by reference to teach the meaning and utility of such a measurement.

The following examples are offered to illustrate the invention and facilitate its understanding without limiting the scope or spirit of the invention. unless otherwise indicated, all parts and percentages reported are by weight.

EXAMPLES 1-5

Examples 1-3 illustrate the laboratory scale production of polymers containing a 2:1 molar ratio of maleic anhydride to 1-alkene by the method of the present invention and Examples 4-5 show the production of 1.5:1 molar ratio polymers.

The composition used in Example 1 was 140 grams (g.) (1 mole) 1-decene, 196 g. (2 moles) maleic anhydride, 224 g. propylene glycol monomethyl ether acetate (hereinafter "PM acetate"), 4.386 g. (1 mole %) di(tertiary-butyl) peroxide initiator (hereinafter "DTBP"), and 1.94 g. (0.33 mole %) tertiary-butyl perbenzoate initiator (hereinafter "TBPB").

The composition used in Example 2 was 196 g. (1 mole) 1-tetradecene, 196 g. (2 moles) maleic anhydride, 261.3 g. PM acetate, 4.386 g. DTBP, and 1.94 g. TBPB.

The composition used in Example 3 was 252 g. (1 mole) 1-octadecene, 196 g. (2 moles) maleic anhydride, 298.7 g. PM acetate, 4.386 g. DTBP, and 1.94 g. TBPB.

The composition used in Example 4 was 196 g. (1 mole) 1-tetradecene, 147 g. (1.5 moles) maleic anhydride, 229 g. PM acetate, 3.655 g. DTBP, and 1.94 g. TBPB.

The composition used in Example 5 was 252 g. (1 mole) 1-octadecene, 147 g. (1.5 moles) maleic anhydride, 266 g. PM acetate, 3.635 g. DTBP, and 1.94 g. TBPB.

The procedure used to prepare each polymer was to charge all of the PM acetate into a 1000 ml., 4-necked round bottom flask equipped with a stirrer, nitrogen sparge tube, thermometer, reflux condenseer, and two addition funnels. The maleic anhydride was charged into one dropping funnel and was heated with a heating tape to melt the maleic anhydride. The 1-alkene was poured into the other addition funnel along with both initiators. The stirrer was started and the solvent in the flask was heated to 160° C. with nitrogen sparging to exclude air from the flask. The contents of the addition funnels were added to the stirring solvent dropwise over a period of one hour. The temperature of the reaction mixture was between 148° C. and 154° C. at the end of the addition. The contents of the flask was held at between 148° C. to 158° C. for an additional period of 90 minutes at which time a colorless to yellowish transparent solution was observed in the flask. The contents of the flask was then poured out into a flat, open aluminum tray and placed in a 70° C. forced air draft oven overnight to obtain a dry polymer product.

Since these reactions were run in laboratory glassware that could not be pressurized, the reaction was limited to the reflux temperature of the solvent. Therefore, two initiators were used to provide a sufficient free radical flux to produce the polymers.

The molecular weights of the resulting polymers were determined using a gel permeation chromatography method with polystyrene standards, an elemental analysis of the polymers of Example 1–3 was performed and the results are reported in Table I. Based on the elemental analysis of the polymers, the ratio of units derived from maleic anhydride to those derived from the 1-alkene used was calculated and the results are also reported in Table I.

TABLE I

| Example No | 1 | 2 | 3 | 4 | 5 |
|---|---|---|---|---|---|
| $\overline{Mn}^1$ | 2240 | 1540 | 2620 | 2720 | 2590 |
| $\overline{Mw}^2$ | 3850 | 2660 | 4130 | 4650 | 3980 |
| $\overline{Mz}^3$ | 5690 | 3930 | 5650 | 6980 | 5430 |
| Mw/Mn | 1.72 | 1.73 | 1.58 | 1.71 | 1.54 |
| Mz/Mn | 2.54 | 2.55 | 2.16 | 2.57 | 2.10 |
| % Carbon | 58.51 | 64.59 | 67.43 | — | — |
| % Hydrogen | 8.02 | 8.40 | 9.64 | — | — |
| % Oxygen | 32.51 | 26.60 | 22.37 | — | — |
| % MAH[4] | 75.9 | 71.0 | 69.0 | — | — |
| % 1-alkene[5] | 24.1 | 29.0 | 31.0 | — | — |

"—" means not determined.
[1] Number average molecular weight.
[2] Weight average molecular weight.
[3] Sedimentation average molecular weight.
[4] Mole percent maleic anhydride units in polymer calculated from elemental analysis.
[5] Mole percent 1-alkene units in polymer calculated from elemental analysis.

The theoretical amount of maleic anhydride expected assuming complete conversion to polymer in Examples 1–3 was 2 moles maleic anhydride units per mole of 1-alkene units or 66.67 mole percent. For Example 1, the theoretical amount of oxygen expected (assuming complete conversion and no losses of reactants) was 28.6% based on the initial moles of maleic anhydride charged. The analysis showed 32.51% oxygen corresponding to 114% over theoretical; taking the analysis of all three elements into consideration, this corresponds to 75.9% maleic anhydride versus 66.67% theoretical. For Example 2, the theoretical oxygen content expected was 24.5%, and the analysis showed 26.60% corresponding to 109% over theoretical or 71.0% maleic anhydride unit content. For Example 3, the theoretical oxygen content expected was 21.4% and the analysis showed 22.3% corresponding to 104% over theoretical or 69.0% maleic anhydride unit content. The analyses showed that as less volatile, higher carbon content 1-alkenes were used, the results came closer to the theoretical amount expected. The above results show that for the laboratory batches prepared, the actual amount of maleic anhydride units obtained from the analysis was in excess of the molar ratios charged, possibly due to a loss of some of the 1-alkene during processing which was done at atmospheric pressure using a reflux condenser. Thus, the process of the present invention results in polymers which have substantially more maleic anhydride incorporated into the polymer than has been previously described and demonstrated by way of experimental examples containing analyses in the prior art known to the Applicants.

The theoretical amount of maleic anhydride expected assuming complete conversion to polymer in Examples 4–5 was 1.5 moles per mole of 1-alkene or 60 mole percent.

EXAMPLES 6–7

These Examples illustrate the pilot plant scale production of polymers containing a 1.5:1 molar ratio of maleic anhydride to 1-alkene by the method of the present invention which further illustrates the use of a precharge of maleic anhydride and 1-alkene. Example 7 used a higher level of initiator than did Example 6.

The composition used in Example 6 was 33.7 pounds of 1-decene (NEODENE 10 from Shell Chemical Company) (109.24 moles), 35.4 pounds (163.86 moles) maleic anhydride, 0.88 pounds (399 g.—1 mole % based on the amount of total moles of maleic anhydride and 1-decene present) DTBP initiator, and 30.0 pounds PM acetate.

In Example 6, a 100 pound capacity, steam-heated reactor equipped with a stirrer, reflux condenser, two feed tanks and a nitrogen inlet tube was charged with a precharge consisting of 3.3 pounds of 1-decene, 3.5 pounds of maleic anhydride and 29 pounds of PM acetate. The reactor was purged with nitrogen gas to remove oxygen and blanketed and pressurized with nitrogen gas to 10 psig (pounds per square inch gauge). The remainder of the 1-alkene was charged to one of the feed tanks along with the initiator. The remainder of the maleic anhydride was charged to the other feed tank which was heat jacketed and the heat was turned on to melt the maleic anhydride. The contents of the reactor were heated to 320° F. (160° C.). At 320° F., the contents of each feed tank were simultaneously fed into the stirring contents of the reactor over a two hour period. The reaction mixture in the reactor was allowed to exotherm to 340° F. (171.1° C.) and held at that temperature during the 2 hour addition of the reactants. During the processing, the pressure in the reactor rose to about 40 psig. After the addition was completed, the 1-alkene/initiator feed line was flushed with 1 pound of PM acetate and the reaction mixture in the reactor was held at about 340° F. for an additional one half hour. The resulting polymer solution at 67.47% nonvolatile solids content was clear and yellow in color. The solution was analyzed for free monomer content and it contained 3.83% unreacted 1-decene and 0.19% maleic anhydride indicating that substantially all of the reactants were converted to polymer. The polymer was dried by pumping the product through an oil heated thin film evaporator at reduced pressure and elevated temperature. The dry polymer obtained was observed to be a clear, yellow, brittle resin which powdered easily. Sixty mole percent of units of maleic anhydride based on the initial amount of monomers charged was expected to be found in the polymer product.

The composition used in Example 7 was 33.3 pounds of 1-decene (NEODENE 10 from Shell Chemical Compandy) (107.88 moles), 35.0 pounds (161.83 moles) maleic anhydride, 1.739 pounds (789 g.—2 mole % based on the amount of total moles of maleic anhydride and 1-decene present) DTBP initiator, and 30.0 pounds PM acetate.

The same procedure was followed as described for Example 6 with the exceptions that 30 pounds of PM acetate was charged to the reactor and that 1 pound of 1-decene was held back and used to flush the initiator feed line (instead of PM acetate) after the 2 hour addition was completed. The resulting polymer solution had a nonvolatile solids content of 69.88%. The solution was analyzed for free monomer content and the results were that there was 0.9% 1-decene and no measurable free maleic anhydride content indicating that the reaction was substantially complete. The amount of units derived from maleic anhydride expected was 60 mole percent based on the initial amount of monomers charged. Thus, by increasing the initiator level, substantially complete conversion of the reactants to polymer was observed.

It has also been found to be helpful to flush the maleic anhydride lines with solvent to insure complete reaction of the monomer charged.

That which is claimed is:

1. A composition of matter comprising a free-radical addition polymer containing at least 55 to about 95 mole percent of units derived from maleic anhydride and from about 5 to 45 mole percent of units derived from at least one 1-alkene having at least 4 to 60 carbon atoms wherein the polymer has an average of at least one unit derived from a 1-alkene per polymer chain based on the number average molecular weight of the polymer and wherein the maleic anhydride units are substantially randomly distributed throughout the polymer chains making up said polymer.

2. The addition polymer of claim 1 wherein each 1-alkene is selected from the group consisting of 1-alkenes having from 4 to 18 carbon atoms.

3. The addition polymer of claim 1 wherein each 1-alkene is selected from the group consisting of 1-hexene, 1-decene, 1-tetradecene and 1-octadecene.

4. The addition polymer of claim 1 wherein each 1-alkene is selected from the group consisting of 1-alkenes having from 12 to 60 carbon atoms.

5. The addition polymer of claim 1 wherein units derived from at least two different 1-alkenes are present in the polymer.

6. The addition polymer of claim 5 wherein one of said alkenes is selected from the group consisting of 1-alkenes having from 4 to 16 carbon atoms and another of said two alkenes is selected from the group consisting of 1-alkenes containing at least 18 carbon atoms.

7. The addition polymer of claim 5 wherein the 1-alkenes are selected from the group consisting of 1-hexene, 1-decene, 1-tetradecene and 1-octadecene.

8. The addition polymer of claim 1 wherein the polymer contains from 60 to 80 mole percent of units derived from maleic anhydride and the remainder of the units are derived from the 1-alkenes.

9. The addition polymer of claim 1 wherein each 1-alkene is selected from the group consisting of 1-alkenes having greater than 18 carbon atoms and the polymer contains at least 65 mole percent of units derived from maleic anhydride.

10. The addition polymer of claim 1 wherein the polymer contains from 65 to 90 mole percent of units derived from maleic anhydride and the remainder of the units are derived from 1-alkenes selected from the group consisting of 1-alkenes having from 10 to 18 carbon atoms.

11. The addition polymer of claim 1 wherein the polymer contains from 65 to 80 mole percent of units derived from maleic anhydride and the remainder of the units are derived from 1-alkenes selected from the group consisting of 1-alkenes having less than 10 carbon atoms.

12. The addition polymer of claim 1 wherein from 1 to 50 mole percent of the carboxyl radicals of said maleic anhydride units are esterified with at least one hydroxy-functional compound having no more than two hydroxyl radicals per molecule and wherein such compound is free of any radicals other than hydroxyl radicals which are reactive with carboxyl or anhydride radicals present in the polymer and no more than 10 mole percent of the total hydroxy-functional compounds present contain two hydroxyl radicals.

13. The addition polymer of claim 12 wherein each such hydroxyl-functional compound contains no more than one hydroxyl radical per molecule.

14. The addition polymer of claim 13 wherein the hydroxyl-functional compounds are selected from the group consisting of $C_6$ to $C_{60}$ alkane alcohols and $C_6$ to $C_{60}$ alkyl monoethers of polyethylene oxide having from about 2 to 20 units derived from ethylene oxide.

15. The addition polymer of claim 1 wherein the polymer contains no more than about 10 mole percent, based on the total amount of maleic anhydride present, of polymaleic anhydride chains which are free of units derived from the 1-alkene.

16. The addition polymer of claim 1 wherein the polymer contains no more than about 5 mole percent, based on the total amount of maleic anhydride present, of polymaleic anhydride chains which are free of units derived from the 1-alkene.

* * * * *